United States Patent [19]

Sprague

[11] Patent Number: 4,517,667
[45] Date of Patent: May 14, 1985

[54] DIRECT READ AFTER WRITE OPTICAL DISK SYSTEM

[75] Inventor: Robert A. Sprague, Saratoga, Calif.

[73] Assignee: Xerox Corporation, Stamford, Conn.

[21] Appl. No.: 387,294

[22] Filed: Jun. 10, 1982

[51] Int. Cl.³ .............................................. G11B 7/12
[52] U.S. Cl. .................................. 369/122; 369/109; 358/347
[58] Field of Search ............... 369/100, 109, 121, 122, 369/112; 358/347

[56] References Cited

U.S. PATENT DOCUMENTS 4,298,974  11/1981  Tsunoda et al. ............... 369/122 X
4,301,527  11/1981  Tsunoda et al. ............... 369/122 X

OTHER PUBLICATIONS

Applied Optics vol. 17, No. 3, pp. 479–485, Feb. 1, 1978.

Primary Examiner—Robert L. Richardson
Attorney, Agent, or Firm—Leonard Zalman

[57] ABSTRACT

An optical disk system having direct read after write capabilities in which the write beam and the read beam are generated by a pair of integrated injection diode lasers. The integration can be achieved by mounting two separate injection diode lasers side by side in a common package or providing two side by side injection diode lasers formed on a common seminconductor substrate. The two lasers would be located in the same focal plane relative to a recording material, with one of the lasers pulse modulated to provide a data modulated write beam and the other laser driven in the continuous wave (CW) regime to provide a read beam of constant intensity. The plane containing the focused beams would be oriented relative to the recording material so that the focused beams impinge upon adacent portions of one data track of the recording material. Since the pair of lasers are closely spaced (1–1000 microns) a common optical path or train is used for both the write beam and the read beam.

4 Claims, 2 Drawing Figures

DIRECT READ AFTER WRITE OPTICAL DISK SYSTEM

BACKGROUND OF THE INVENTION

Digital optical disks are now being seriously considered as potential alternatives to magnetic tape and disk memories. It has been found that optical disks offer a substantially greater data storage capacity than commercially available magnetic tape or disk memories of similar size.

The read/write head of many conventional optical disk systems generally includes a write beam optical path and a read beam optical path which is generally separate from the write beam optical path. The write beam optical path generally includes a relatively high power laser, some modulation scheme for the high power laser whereby an information modulated write beam is provided, beam conditioning optics, and mirrors which cause the write beam to illuminate one side of a beam splitter. The read beam optical path generally includes a lower power continuously emitting laser, beam conditioning optics, and mirrors which cause the read beam to illuminate the other side of the beam splitter. The write and read beams are combined by the beam splitter, with the combined beams first illuminating a polarization beam splitter, then illuminating a quarter (¼) wavelength polarization plate, and subsequently being brought to focus on the optical disk by an objective lens. The read beam reflected off the disk is transmitted through the quarter (¼) wavelength polarization plate to the polarization beam splitter which reflects the read beam into a second read beam path such that the read beam illuminates a detector which detects its intensity (to read data) and provides focusing and tracking information.

Reading recorded information immediately after writing that information, or direct read after write, would provide a number of system advantages. However, direct read after write is difficult to achieve reliably and economically with systems having separate laser sources because it is difficult to achieve relative positional stability between the write and read beams. Accordingly, there is a need for an effective direct read after write optical disk system which does not require alignment of two separate laser sources.

SUMMARY OF THE INVENTION

An optical disk system is disclosed in which the write beam and the read beam are generated by a pair of integrated injection diode lasers. The integration can be achieved by mounting two separate injection diode lasers side by side in a common package or providing two side by side injection diode lasers formed on a common semiconductor substrate. The two lasers would be located in the same focal plane relative to a recording material, with one of the lasers pulse modulated to provide a data modulated write beam and the other laser driven in the continuous wave (CW) regime to provide a read beam of constant intensity. The plane containing the focused beams would be oriented relative to the recording material so that the focused beams impinge upon adjacent portions of one data track of the recording material. Since the pair of lasers are closely spaced (1-1000 microns) a common optical path or train is used for both the wire beam and the read beam.

The diode array optical disk system disclosed has several advantages over conventional systems. First, by combining the two lasers in a common package, a two laser system is achieved with the same optical train or path which would be utilized in a single laser optical disk system. Thus, most of the advantages of a two laser system are achieved, with no cost impact on the optics and no alignment problems with the light sources. At the same cost of a single laser system (except for the cost impact of the dual laser source) the following system advantages are achieved. First, tracking and focusing are done by using the read beam which is unmodulated and hence easier to work with than the modulated write beam, thus greatly simplifying electronic dymanic range problems in tracking and focusing. Second, direct read after write is allowed, increasing system reliability and data density because of reduced ECC. Third, the existence of direct read after write with the read laser allows for implementation of real time intensity feedback on the write laser with the recording media included in the feedback loop. This guarantees the proper recording level at the media, providing significantly increased system reliability, relaxed tolerances on media sensitivity and sensitivity uniformity, and allows for potential use of an edge position data modulation scheme, resulting in increased data density. Finally, because two lasers coexist in the system, a possible fail safe operational mode is achieved whereby if one laser fails, the other could still be used for reading, thus freeing the stored data base from down time caused by laser failure. All of these features combined will result in more reliable optical disk systems and a potential increase in storage capacity by perhaps as much as an order of magnitude.

DETAILED DESCRIPTION OF THE INVENTION

Figure 1:
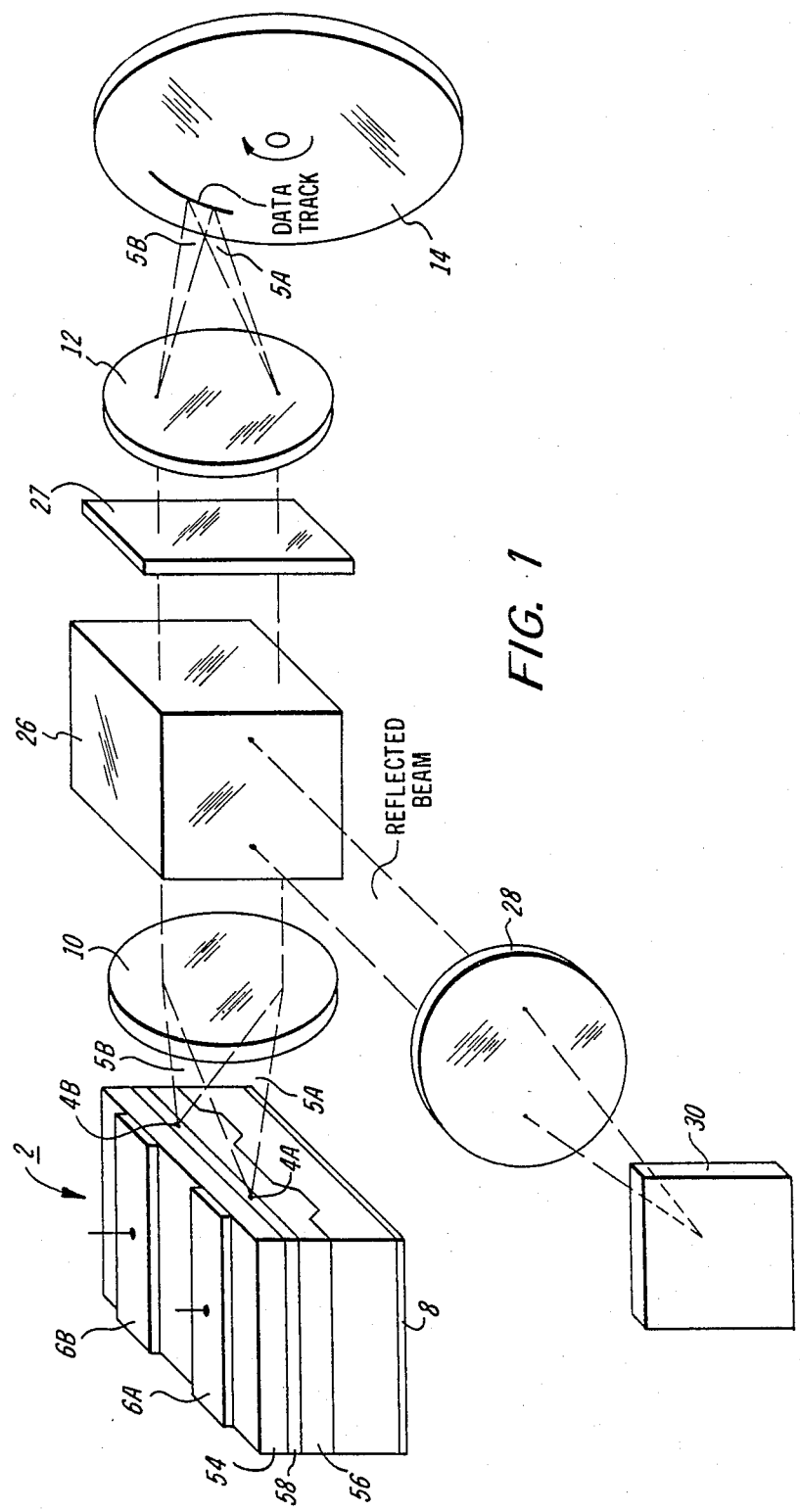
FIG. 1 is a perspective view of an optical disk scanning system in accordance with the invention.
Figure 2:
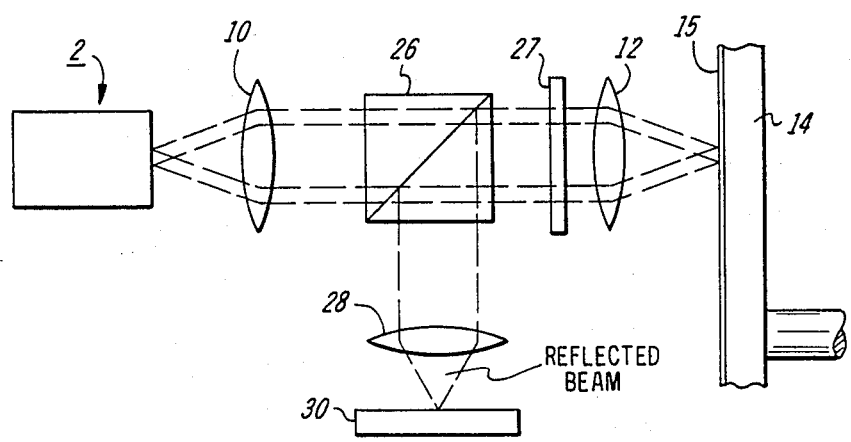
FIG. 2 is a side view of the system of FIG. 1.

Referring to FIGS. 1 and 2, the direct read after write optical disk system of the invention includes a linear diode laser array 2 comprised of a pair of injection diode lasers 4a, 4b. Lasers 4a, 4b can be of any conventional solid state type. One example, using a channeled substrate design, as shown in FIG. 1, provides light from an active layer 58 sandwiched between cladding layers 54 and 56. Each of the lasers 4a, 4b has its own current drive provided by electrodes 6a, 6b, respectively, acting in conjunction with substrate electrode 8. Lasers 4a and 4b would be closely spaced, having, for example, a separation of about 1-1000 microns. Laser 4a is driven by the data signal to provide an intensity modulated write beam 5a and laser 4b is drive continuously to provide an unmodulated read beam 5b.

Due to the close spacing of lasers 4a and 4b, a common optical path or train is used for both the write beam 5a and the read beam 5b. Accordingly, the optical path for beams 5a and 5b includes a collector lens 10 and an objective lens 12. Collector lens 10 collimates the diverging light from lasers 4a and 4b and objective lens 12 focuses the collimated beams 5a and 5b upon a threshold sensitive recording material 14. In keeping with accepted practice, the objective lens 12 can be moved back and forth relative to recording material 14 by a servo controlled voice coil (not shown) so that the beams 5a and 5b are sharply focused at the recording medium 14.

Recording medium 14 is a light level sensitive recording material which, typically, is a movable disk rotated (by means not shown) during operation at an essentially constant velocity in the direction of the arrow relative to array 2. For example, recording medium 14 suitably comprises an ablatable tellerium based, reflective film 15 which is coated on an optically transparent substrate, such as glass or plastic. In that event, the pulse output power of laser 5a, as controlled by modulation of the current applied to electrode 6a, is selected so that the intensity of the write beam 5a, as measured at the surface of the film 15, swings above and below a predetermined ablation threshold level for the film as a function of the modulation. Consequently, the write beam 5a opens small holes in film 15 along a data track position (as shown in FIG. 1), or otherwise changes the physical nature of portions of the film along a data track position, for example, by modifying its absorption, reflectivity or polarization properties, with such holes or changes representing the binary data which is to be recorded. The data track can be a portion of a continuous spiral or one of a plurality of concentric data tracks.

The drive signal applied to electrode 6b is of a substantially constant magnitude to provide the unmodulated read beam 5b. The intensity of read beam 5b is below the threshold recording level of the film 15. Thus, continuous wave read beam 5b does not effect the optical properties of the film 15 but is reflected therefrom after being intensity modulated in accordance with any recorded data it scans.

To retrieve previously recorded data and to provide radial tracking and focusing control, the common optical path would generally include a polarization beam splitter 26 and a quarter (¼) wavelength polarization plate 27 located between lenses 10 and 12, a second objective lens 28, and a detector 30. The quarter wavelength polarization plate 27 and the polarization beam splitter 26 cause the reflected beam to be transmitted to the detector 30. Detector 30, which may be a single or split detector, is used to provide readback data off the disk, as well as focus and tracking information, when laser 4b is emitting. During recording of data, laser 4a would provide the modulated write beam 5a for data recording and, as noted, laser 4b would provide the unmodulated read beam 5b for data detection, tracking and focusing. Obviously, the read beam would be focused upon the recording material a short distance (equal to the separation between lasers 4a and 4b if a one to one optical system is used) behind the focus point of the write beam in the direction of movement of the recording material. Thus, a direct read after write optical disk system which permits use of a single optical path for focus, tracking, writing and reading is provided.

The diode array direct read after write optical disk system disclosed has several advantages over conventional systems. First, by combining the two lasers in a common package, a two laser system is achieved with the same optical train or path which would be utilized in a single laser optical disk system. Thus, most of the advantages of a two laser system are achieved, with no cost impact on the optics and no alignment problems for the light sources. At approximately the same cost of a single laser system the following system advantages are achieved. First, tracking and focusing are done by using the read beam which is unmodulated and hence easier to work with than the modulated write beam. This greatly simplifies electronic dynamic range problems in tracking and focusing. Second, direct read after write is allowed, increasing system reliability and data density because of reduced ECC. Third, the existence of direct read after write allows for implementation of read time intensity feedback on the laser with the recording media included in the feedback loop. This guarantees the proper recording level at the media, providing significantly increased system reliability, relaxed tolerances on media sensitivity and sensitivity uniformity, and allows for potential use of an edge position data modulation scheme resulting in increased data density. Finally, because two lasers coexist in the system, a possible fail safe operational mode is achieved whereby if one laser fails, the other could still be used for reading, thus freeing the stored data base from down time caused by laser failure. All of these features combined will result in a more reliable optical disk system and a potential increase in storage capacity by perhaps as much as an order of magnitude.

Although the foregoing description has been related to write-once ablative optical disk recording, the described common package two laser direct read after write concept is applicable to any system using an optical disk for storage. As an example, a magneto-optic storage disk system could utilize the common package two laser direct read after write concept, with the polarization properties of the readout beam being sensed rather than its intensity modulation.

I claim:

1. An optical disk scanning system with direct read after write capabilities comprising:
   a light level sensitive recording material capable of recording data along a data track positioned at least substantially concentric with other data tracks;
   first means for moving said recording material;
   a pair of integrated solid state lasers;
   drive means for said lasers for providing an information modulated light beam and an unmodulated light beam;
   second means for transmitting said beams to only said data track; and
   third means for detecting changes in a physical property of the unmodulated beam reflected from said recording material.

2. An optical disk scanning system with direct read after write capabilities comprising:
   a light level sensitive recording material capable of recording data along a data track positioned at least substantially concentric with other data tracks;
   first means for moving said recording material;
   a pair of integrated solid state lasers formed on a common semiconductor substrate;
   drive means for lasers for providing an information modulated light beam and an unmodulated light beam;
   second means for transmitting said beams to only said data track; and
   third means for detecting changes in a physical property of the unmodulated beam reflected from said recording material.

3. An optical disk scanning system with direct read after write capabilities comprising:
   a light level sensitive recording material capable of recording data along a data track positioned at least substantially concentric with other data tracks;
   means for moving said recording material;

a pair of integrated diode lasers;

drive means for supplying a variable magnitude drive signal to one of said pair of lasers to provide a modulated write beam and a substantially constant magnitude drive signal to the other of said pair of lasers to provide an unmodulated read beam;

optical means for transmitting said beams to said data track such that said read beam illuminates only said data track behind the portion of said data track illuminated by said write beam in the direction of movement of said recording material; and means for detecting changes in a physical property of the read beam reflected from said recording material.

4. An optical disk scanning system with direct read after write capabilities comprising:

a light level sensitive recording material capable of recording data along a data track positioned at least substantially concentric with other data tracks;

means for moving said recording material;

a pair of integrated diode lasers formed on a common semiconductor substrate;

drive means for supplying a variable magnitude drive signal to one of said pair of lasers to provide a modulated write beam and a substantially constant magnitude drive signal to the other of said pair of lasers to provide an unmodulated read beam;

optical means for transmitting said beams to said data track such that said read beam illuminates only said data track behind the portion of said data track illuminated by said write beam in the direction of movement of said recording material; and means for detecting changes in a physical property of the read beam reflected from said recording material.

* * * * *